Feb. 2, 1960 R. M. WILLETT 2,923,837
SWEEP CIRCUIT
Filed Feb. 1, 1956
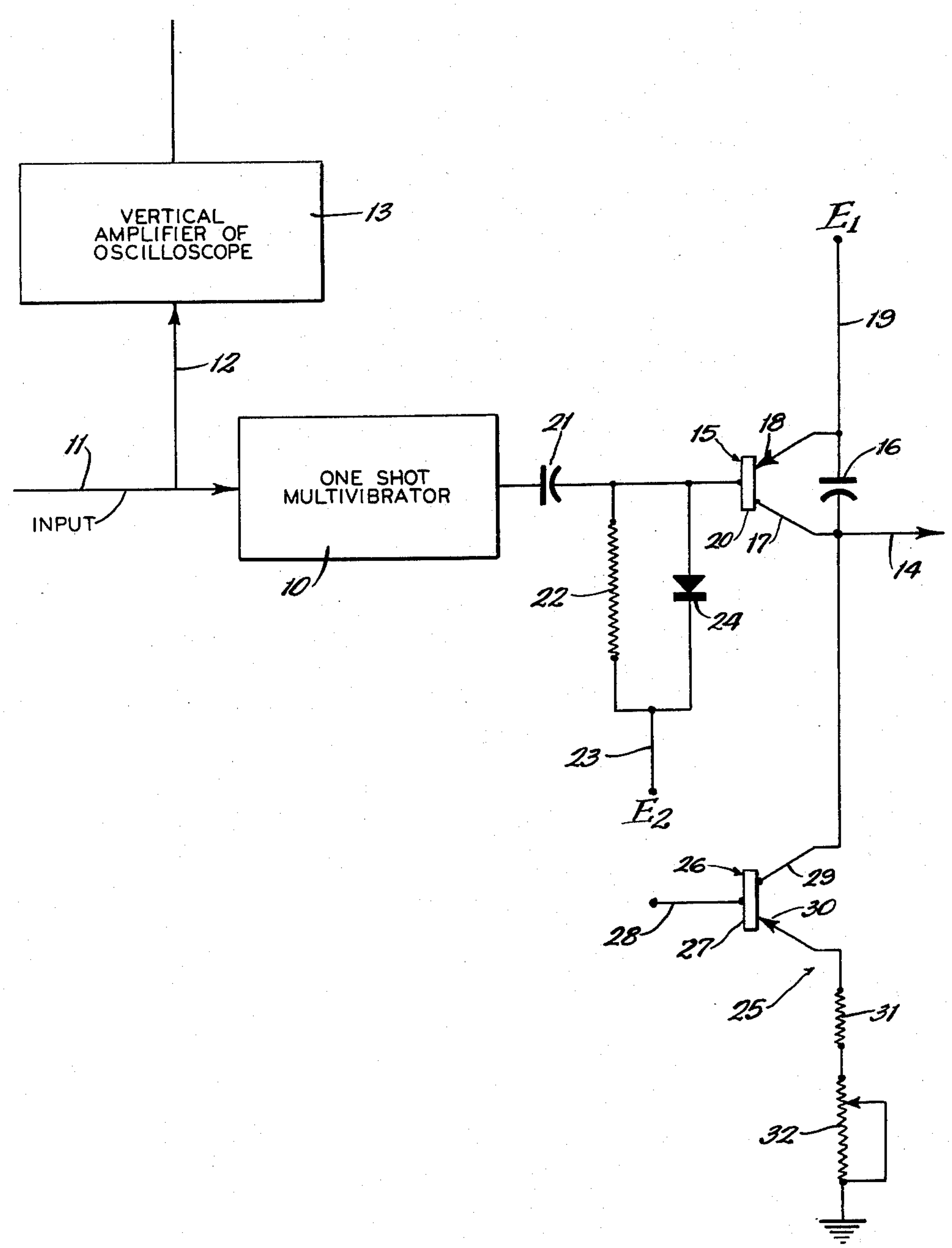
INVENTOR:
Richard M. Willett,
BY
Dawson, Tilton & Graham,
ATTORNEYS.

United States Patent Office 2,923,837

Patented Feb. 2, 1960

2,923,837

SWEEP CIRCUIT

Richard M. Willett, Ames, Iowa, assignor to Iowa State College Research Foundation, Inc., Ames, Iowa, a corporation of Iowa Application February 1, 1956, Serial No. 562,818

2 Claims. (Cl. 307—88.5)

This invention relates to a sweep circuit, and more particularly to a triggered sweep circuit adapted for use with cathode ray tubes having deflection plates—that is, cathode ray oscillographs—such as those employed in oscilloscopes and small television receivers.

An object of the invention is to provide a sweep circuit of the character described that has the advantage of simplicity and that has exceptionally fine linearity. Another object of the invention is in the provision of a triggered sweep circuit that is compact to the extent that it may be used as an accessory with oscilloscopes, for example, that are not originally provided with a triggered sweep circuit, and that may also be built in as an integral part of an original unit. Still another object is that of providing a triggered sweep circuit employing transistors and that produces a relatively high sweep voltage output so that it may be fed directly to the horizontal deflection plates of a cathode ray oscillograph rather than being fed to the deflection plates through a horizontal amplifier in the event that such amplifier does not have good linearity.

A further object of this invention is to provide a triggered transistorized sweep circuit employing a constant current source in circuit with and for a transistor across which the sweep voltage is taken, and a pulsating network coupled to the transistor in a manner such that the transistor is cut off or made unconductive when pulses of a predetermined character are imposed thereon. Additional objects and advantages will appear as the specification develops.

The sweep circuit of this invention is illustrated schematically in the accompanying drawing.

The circuit comprises a multivibrator that in the drawing is shown in block form, and is designated with the numeral 10. The multivibrator 10, as is well known, forms a pulsing network providing flat-topped pulses for cutting off the transistor which will be described hereinafter. The multivibrator may be any standard transistor single-shot multivibrator, such being well known in the art, or it may be a double-base multivibrator such as described in the July, 1955 issue of the "Proceedings of the IRE." Where it is desired to have a high input impedance for the multivibrator 10, an emitter follower (grounded collector transistor) may be employed. An input impedance of about 100,000 ohms can be obtained with such a circuit; and if it is desired to further increase the impedance, a transformer coupling may be used, as is well known in the art. The input for the multivibrator 10 is indicated by the line 11, and it is apparent that this same input may be fed through a line 12 to the vertical amplifier 13 of an oscilloscope, assuming that the sweep circuit is being used with an oscilloscope. That is, the synchronizing voltage comprising the input for the multivibrator may be taken directly from the unit with which the sweep circuit is used, and in the illustration, the same synchronous voltage may be coupled to the multivibrator as that fed to the vertical amplifier of the oscilloscope.

The sweep voltage output is indicated with the numeral 14 and is taken across the parallel combination of a transistor 15 and variable capacitor 16. The collector 17 and emitter 18 are connected, respectively, to opposite sides of the capacitor 16, and the output 14 is connected to the junction between the collector and capacitor. The emitter 18 is connected to a source of voltage $E_1$ through a line 19.

The base 20 of the transistor is coupled to the output of the multivibrator through a variable coupling capacitor 21 and coupling resistor 22. The capacitor 21 is connected in series between the multivibrator and transistor, and the resistance 22 has one side thereof connected to the base of the transistor and the other side connected to a source of voltage $E_2$ through a lead 23. In parallel with the resistance 22 is a rectifier 24, that may be a germanium rectifier if desired, and is used in the circuit to keep the base 20 of the transistor from becoming positive with respect to the voltage $E_2$. The values of the capacitor 21 and resistance 22 are selected so as to provide a good coupling between the multivibrator and transistor for the lowest frequency—that is, longest pulse—of the multivibrator to be encountered.

The transistor 15 is connected in series with a constant current source that is designated generally with the numeral 25. This constant current source comprises a transistor 26 having a base 27 connected to a constant voltage source $E_3$ through a line 28. The collector 29 of the transistor is connected directly to the capacitor 16 and collector 17 of the transistor 15. The emitter 30 of the transistor 26 is connected to ground through a fixed resistance 31 and a variable resistance 32. The value of the resistance 32 may be varied to control the current of the collector 29 and to thereby provide a fine adjustment of the slope of the sweep voltage appearing at the output 14. A coarser adjustment of the slope of the sweep voltage is provided by the variable capacitor 16.

The transistors 15 and 26 may be germanium transistors, the output of which is fairly low, or silicon transistors with 150 volt collector voltage ratings. The only practical limit to the magnitude of the sweep voltage appearing at the output 14 is the collector voltage ratings of the transistors, and when silicon transistors are used, a sweep voltage in excess of 100 volts may be readily obtained.

In operation of the circuit, the transistor 15 is normally conducting in the saturation region thereof, and the voltage across it and the capacitor 16 at such time is very low. The one-shot multivibrator 10 is adapted to provide flat-topped pulses having a magnitude sufficient to cut off the transistor 15. When such pulses are coupled to the base 20 of the transistor, the transistor ceases to conduct collector current. At this time, the impedance from the emitter to the collector becomes very large, and the capacitor 16 begins to charge. Because the capacitor 16 is charged with a constant current source, the change in voltage across the capacitor will increase linearly with time. Upon the termination of the pulse from the multivibrator, the transistor will begin to conduct current again, and the voltage across the capacitor again drops to a small value and remains at that value until the next pulse from the multivibrator appears on the base 20 of the transistor.

In the constant current source 25, the resistances 31 and 32 comprise a large series resistance in the emitter circuit of the transistor 26. The voltage $E_3$ is a constant voltage and, then, any change in collector current will cause a change in the voltage drop across the series resistances 31 and 32. Such a change in the voltage drop will change the base to emitter voltage in a manner to correct for the change in current. The current source 25 will then provide a substantially constant current over a wide range of collector voltages for it compensates or corrects itself whenever a tendency toward a change in current appears at the collector.

It will be apparent that the sweep time may be varied by changing the time constants of the multivibrator 10. The output of the multivibrator should have a magnitude that is greater than the difference between the voltage $E_2$ and $E_1$—that is, in equation form, $e>E_2-E_1$, where $e$ equals the magnitude of the multivibrator output.

The sweep voltage appearing at the output line 14 may be fed to the horizontal amplifier used with a cathode ray oscillograph having a sweep controlled by the triggered sweep circuit herein described. Alternatively, as has been brought out, and because of the relatively high voltage of the sweep output, that output may be coupled directly to the horizotnal deflection plates of the cathode ray oscillograph. The sweep voltage output has exceptionally fine linearity and, as is apparent, the circuit is quite simple and can be made in a compact unit.

While in the foregoing specification an embodiment of the invention has been set forth in considerable detail for purposes of making a complete disclosure thereof, it will be apparent that those skilled in the art may make numerous changes in those details without departing from the spirit and principles of the invention.

I claim:

1. In a sweep circuit of the character described, a multivibrator, a constant current source, a transistor having the base thereof coupled to said multivibrator, the collector of said transistor being connected to said constant current source, a capacitor connected between the collector and emitter of said transistor and across which the output of said circuit is taken, a voltage source connected to the emitter of said transistor and another voltage source connected to the base of said transistor, the output magnitude of said multivibrator being greater than the difference between the voltage sources connected to the base and emitter of the transistor, said transistor being normally conductive but being rendered non-conductive by pulses from said multivibrator, rectifier means interconnected between the base of said transistor and the voltage source connected to said base for preventing the base from becoming positive with respect to the voltage source connected thereto, said constant current source comprising a second transistor having its base connected to a constant voltage source with the collector thereof being connected to the collector of the first-mentioned transistor, and resistance means coupling the emitter of said second transistor to ground.

2. In a sweep circuit, a transistor having a capacitor coupled across the emitter and collector thereof, a constant current source connected to said collector, said constant current source comprising a second transistor and having its base connected to a constant voltage source with the collector thereof being connected to the collector of the first-mentioned transistor, resistance means coupling the emitter of the constant current source transistor to ground, said capacitor and resistance means being variable to alter the shape of the sweep voltage developed across said capacitor, a constant voltage source connected to the emitter of the first-mentioned transistor, and a pulsing network connected to the base of the first-mentioned transistor, said pulsing network including a capacitance coupled to the base of the first-mentioned transistor, said pulsing network including a source of voltage coupled to said first-mentioned transistor base, the voltage sources connected to the base and emitter of said first-mentioned transistor being adjusted so that the output magnitude of said multivibrator is greater than the difference between the voltage sources connected to the base and emitter of the said first-mentioned transistor.

References Cited in the file of this patent

UNITED STATES PATENTS

| | | |
|---|---|---|
| 2,554,172 | Custin | May 22, 1951 |
| 2,614,142 | Edson | Oct. 14, 1952 |
| 2,663,800 | Herzog | Dec. 22, 1953 |
| 2,688,075 | Palmer | Aug. 31, 1954 |
| 2,735,011 | Dickinson | Feb. 14, 1956 |
| 2,747,136 | Herzog | May 22, 1956 |
| 2,797,327 | Kidd | June 25, 1957 |
| 2,824,962 | Wise | Feb. 25, 1958 |